(No Model.)

T. SAUNDERS.
GASKET.

No. 519,413. Patented May 8, 1894.

Witnesses:
C. E. Buckland.
A. T. Pease.

Inventor:
Theodore Saunders,
by
H. R. Williams
Atty.

THE NATIONAL LITHOGRAPHING COMPANY,
WASHINGTON, D. C.

UNITED STATES PATENT OFFICE.

THEODORE SAUNDERS, OF DANBURY, CONNECTICUT, ASSIGNOR OF ONE-HALF TO EDMUND TWEEDY, OF SAME PLACE.

GASKET.

SPECIFICATION forming part of Letters Patent No. 519,413, dated May 8, 1894.

Application filed December 5, 1893. Serial No. 492,865. (No model.)

*To all whom it may concern:*

Be it known that I, THEODORE SAUNDERS, a citizen of the United States, residing at Danbury, in the county of Fairfield and State of Connecticut, have invented certain new and useful Improvements in Gaskets, of which the following is a specification.

The invention relates to the gaskets or packings employed for making fluid tight joints in boilers, pipes and other structures of steam, hydraulic or pneumatic devices or systems that use, hold or convey fluids under pressure; and the object is to provide for such purposes a simple and economic gasket or packing of great durability and effectiveness, which has the proper amount of elasticity, will resist wear and the destructive action of heat, steam, and other hot or cold fluids, and which may readily be fitted and placed in position in any form of opening to be packed, from which, if necessary at any time, it can be easily removed and quickly renewed by simple and inexpensive means.

Figure 1:
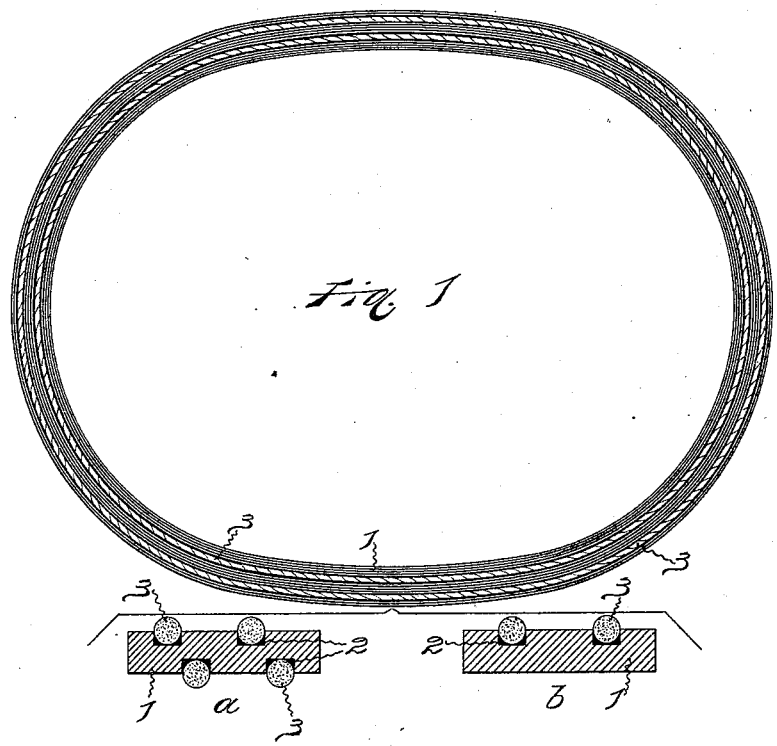
Figure 2:
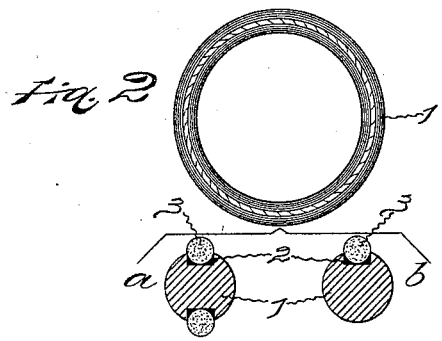
Figure 3:
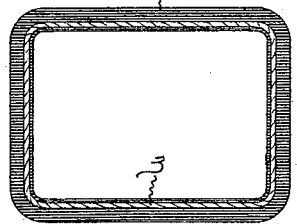

Referring to the accompanying drawings:— Figure 1 is a plan of a man-hole gasket embodying the invention; a in this figure being an enlarged cross-section of the gasket and b a cross-section of a modified form of the same. Fig. 2 is a plan of a packing ring embodying the invention; a in that figure representing an enlarged cross-section of the ring, and b a similar section of a modified form of such ring. Fig. 3 is a plan of a hand-hole gasket embodying the invention; a being an enlarged cross-section, and b showing a section of a modified form of the latter gasket.

The body, 1, of the gasket or packing is formed of a strip, ribbon or rod of soft flexible or pliable metal, as lead, of any convenient size, which may be round, elliptical, rectangular or any other shape in cross-section that is suitable for the special use to which the gasket is to be applied. These strips, which may be wound upon a reel for convenience in storing and handling, may be cut from a continuous piece of metal in the proper lengths and bent over a templet or pattern, or otherwise formed into a round, square or oblong ring, band or hoop of the required size to fit the opening to be packed.

In the metallic body of the gasket one or more narrow grooves, 2, are formed on one face only, or on both the upper and under faces, as desired, and in each groove, so as to be held thereby, with a portion projecting above the face of the metal is fitted a piece of spun, woven or matted asbestus cord, 3, or other material made of fibers that are themselves inelastic, which, however, being woven, spun or matted together, permit of sufficient yielding to form a tight packing when in use, without losing its effectiveness by deterioration of elasticity. These grooves, which are usually made in the strip, ribbon or rod when it is drawn and before it is wound upon the reel or cut in lengths, are somewhat smaller in cross-section than the cross-section of the asbestus cord, so that the cord will more than fill the grooves which hold it in place. The asbestus cord or fiber, which is woven, spun or matted into a mass usually a little larger in cross-section than the size of the grooves, is firmly pressed into position and sometimes a small amount of glue, shellac, or other cement that hardens under heat is placed in the grooves before putting in the cord, to cause it to adhere and more firmly hold to the metal. For general purposes, I prefer flat ribbons of this soft metal with one or two grooves, rectangular in cross section, upon each of the broad surfaces, that will securely hold the asbestus cord or fiber in place with a portion projecting above the surface of the metal to such an extent that the cord will not entirely be compressed into the grooves when the joint is screwed up. When strips are cut from a continuous length and not cast or stamped to shape the ends are fastened together in any convenient manner. This may be done by soldering or by metallic fasteners, but it is preferred to fuse them together in a heated mold.

My improved gasket is very durable, not being injuriously affected by heat, steam, or other hot or cold gases or fluids. It can be used a number of times, as the nature of the fibers and the manner of forming the packing cord is such that it does not lose its yielding characteristics under the influence of heat, while most kinds of gaskets, particularly those made of rubber, can be used but once. It is very flexible and cannot be easily broken. It is readily adjusted to position, and, on account of the flexibility of the metal and the yielding and flexibility of the asbestus cord or fiber, which projects above the surface of the metal, conforms itself under pressure to all the irregularities of the surfaces with which it comes into contact and makes an unusually tight and durable joint. It does not melt or stick, and can be removed and replaced with great facility. It will not corrode the iron as many gaskets do. If the asbestus cord should be worn or injured it can be replaced with ease and at trifling expense, and the greater part of the cost of a new gasket be saved.

I claim as my invention—

1. A gasket composed of a grooved body of pliable metal with fibrous cord held in place by the groove which it occupies, substantially as specified.

2. A gasket composed of a grooved body of pliable metal with cord of non-elastic fibers held in place by the groove which it occupies, substantially as specified.

3. A gasket composed of an endless ring of pliable metal having longitudinal grooves, and fibrous asbestus cord held in place by said grooves with a portion projecting above the surface of the metal, substantially as specified.

4. A gasket composed of an endless ring of pliable metal of rectangular cross-section having longitudinal grooves in its upper and lower faces, cord of asbestus fibers held in said grooves, with a portion projecting above the surface of the metal, and a cement that hardens by heat for holding the cord in the grooves, substantially as specified.

THEODORE SAUNDERS.

Witnesses:
EDMUND TWEEDY,
H. R. WILLIAMS.